United States Patent
Higashida et al.

(10) Patent No.: US 7,408,960 B1
(45) Date of Patent: Aug. 5, 2008

(54) METHOD AND APPARATUS FOR DATA TRANSMISSION, AND METHOD AND APPARATUS FOR DATA RECEPTION

(75) Inventors: Masaaki Higashida, Osaka (JP); Yoshihiro Morioka, Nara (JP); Satoshi Oyama, Hyogo (JP); Tatsushi Bannai, Osaka (JP); Minoru Nishioka, Hyogo (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/646,665

(22) PCT Filed: Jan. 19, 2000

(86) PCT No.: PCT/JP00/00223

§ 371 (c)(1),
(2), (4) Date: Nov. 27, 2000

(87) PCT Pub. No.: WO00/44125

PCT Pub. Date: Jul. 27, 2000

(30) Foreign Application Priority Data

Jan. 20, 1999 (JP) .................................. 11-011798

(51) Int. Cl.
*H04J 3/06* (2006.01)
(52) U.S. Cl. ....................... 370/513; 370/503
(58) Field of Classification Search ................ 370/503, 370/509, 512–515; 360/48; 375/365, 366
See application file for complete search history.

(56) References Cited

U.S. PATENT DOCUMENTS

| | | | |
|---|---|---|---|
| 3,903,356 A | 9/1975 | Watatani et al. | |
| 4,344,180 A * | 8/1982 | Cummiskey | 375/368 |
| 4,757,518 A * | 7/1988 | Lagadec | 375/253 |
| 5,289,476 A | 2/1994 | Hurlbut et al. | |
| 5,712,624 A * | 1/1998 | Ayerst et al. | 340/825.21 |
| 5,727,036 A | 3/1998 | Maertens | |
| 5,856,979 A * | 1/1999 | Vogel et al. | 370/503 |
| 6,072,839 A * | 6/2000 | Mondal et al. | 375/265 |
| 6,191,903 B1 * | 2/2001 | Fujimoto et al. | 360/48 |

(Continued)

FOREIGN PATENT DOCUMENTS

EP 456946 A1 * 11/1991

(Continued)

OTHER PUBLICATIONS

Rhodes, D. "On Some Practical Approximations to the Ideal Group Synchronization Process". IEEE Transaction on Communciations. Jun. 1963. vol. 11. iss. 2. pp. 222-229.*

(Continued)

*Primary Examiner*—Chi Pham
*Assistant Examiner*—Donald L Mills
(74) *Attorney, Agent, or Firm*—RatnerPrestia

(57) ABSTRACT

When a packet data is transmitted, a sync pattern comprising 'q' words ('q'=m+n) is added to the data. The 'q' words is formed by combining a fixed pattern comprising 'm' words ('m' is an integer greater than 0) with plural types of variable patterns each comprising 'n' words ('n' is an integer greater than 1). In this case, a bit structure included in at least two consecutive packets should include different types of variable patterns.

22 Claims, 11 Drawing Sheets

U.S. PATENT DOCUMENTS 6,208,666 B1 * 3/2001 Lawrence et al. ........... 370/503

FOREIGN PATENT DOCUMENTS

| EP | 617423 A2 * | 9/1994 |
|----|-------------|--------|
| JP | 61-168173 | 7/1986 |
| JP | 63-292841 | 11/1988 |
| JP | 6-326967 | 11/1994 |
| JP | 8-307859 | 11/1996 |
| JP | 08-335936 | 12/1996 |
| JP | 8-335936 | 12/1996 |
| JP | 2693758 | 9/1997 |
| JP | 10-285152 | 10/1998 |
| JP | 11-112486 | 4/1999 |
| WO | WO 98/02988 A | 1/1998 |
| WO | WO 98/52323 A | 11/1998 |

OTHER PUBLICATIONS

Inaba, H. et al. "Notes on Codes for Synchronization Error Correcting". IEEE International Symposium on Information Theory. Aug. 16-21, 1998. p. 58.*

T. Kimura et al., "An Application of MPEG-2 Systems to ISDB Transport System," May 1994, ITE Technical Report, vol. 18, No. 28, pp. 7-12, (w/partial English translation).

Japanese search report for PCT/JP00/00223 dated Apr. 25, 2000.

English translation of Form PCT/ISA/210.

European Search Report corresponding to application No. EP 00-90-0815 dated Nov. 30, 2004.

* cited by examiner

FIG. 6

METHOD AND APPARATUS FOR DATA TRANSMISSION, AND METHOD AND APPARATUS FOR DATA RECEPTION

This application is a U.S. national phase application of PCT International Application PCT/JP00/00223.

TECHNICAL FIELD

The present invention relates to a method of communicating packet data through a transmission line.

BACKGROUND ART

When packet data is transmitted, several packet data are gathered to form a data having a fixed length, and sync patterns are added to the data before transmission. A receiver detects the sync patterns and then extracts the packet data. This is a known method in this field. In other words, this data stream comprises a plurality of data placed between the sync patterns disposed at fixed intervals.

In general, the receiver detects the sync patterns, and when two sync patterns at a given intervals are detected, these two patterns are determined right sync patterns, then the receiver starts securing the sync referencing the positions of the sync patterns.

A flywheel fashion is one of the securing methods, and according to the flywheel fashion, when right sync patterns are detected, windows are opened at the given intervals referencing the detected positions, then only the sync patterns are examined through the windows again. This is a known method in the field, and is used not only in communication but also in VCRs for sync security. However, this method may encounter the following problems.

A series of sync patterns recognized as right sync patterns ignites the flywheel action for sync security. If sync patterns are detected in series at wrong places, sync security is activated on a phase independent of data transmission, and as a result, wrong data is received.

One of the major factors in detecting wrong sync patterns is the problem of generating so called 'pseudo sync pattern'. In other words, the same pattern as the sync pattern occur with a certain probability in the data being transmitted. When a signal, of which bit-structure cannot be predicted, such as a video signal or an audio signal is transmitted, this problem is inevitable. In particular, when a fixed pattern occurs at a fixed position during the data transmission, the pseudo sync patterns thus occur at fixed intervals. Therefore, the pseudo sync pattern may start the flywheel action. As a result, the receiver receives totally different data.

In order to solve this problem, a plurality of different sync patterns are used. Japanese Patent Application Non-examined Publication No. S61-168173 discloses the method of using plural types of sync patterns. Although using plural different sync patterns, this prior art places plural different sync patterns in series with respect to sequential data thereby recording or playing back the data, i.e. prolong the sync pattern thereby reducing the probability of the pseudo sync pattern. Therefore, as long as the pattern occur at fixed intervals during the data transmission, this prior art cannot solve the problem, but adversely it increases data redundancy, which entails a larger size of circuit.

In other words, to realize a communication method eliminating the pseudo sync pattern and allowing reliable sync security, conventional methods have inherent problems discussed above, i.e. prolonging a bit length of the sync pattern thereby increasing the data redundancy, which needs a larger circuit.

SUMMARY OF THE INVENTION

The present invention addresses the problem discussed above and aims to provide a stable communication method with a normal sync security using a sync pattern comprising less numbers of bits. A wrong sync security due to pseudo sync patterns is avoided although the less number of bits are used.

The present invention uses a method of packet data transmission in which sync patterns are added to packet data before the data is transmitted.

This method comprising the steps of:
(a) generating a fixed pattern formed of 'm' words ('m' is an integer not less than 0 (zero));
(b) generating plural types of variable patterns formed of 'n' words ('n' is an integer not less than 1 (one));
(c) generating a sync pattern formed of 'q' words ('q'='m'+'n'), i.e. combining the fixed pattern and the variable pattern;
(d) controlling over generating the sync pattern so that the respective variable patterns included in at least two consecutive packets may comprise different bit-structure.

BRIEF DESCRIPTION OF THE DRAWINGS

FIG. 6 illustrates bit-structure of a fixed pattern.

DETAILED DESCRIPTION OF PREFERRED EMBODIMENTS

Exemplary Embodiment 1

The first exemplary embodiment of the present invention is demonstrated hereinafter with reference to FIGS. 1, 2, 3, 4, 5, 9, 10, 11.

In this embodiment, the following data are used as packet data to be transmitted: packet data of interface (DIF stream) between apparatuses of (a) audio data of digital video for a professional use, (b) compressed video data, and (c) additional data. The DIF stream is standardized based on "Specifications of Digital Interface for Consumer Electric Audio/Video Equipment" December, 1995 HD DIGITAL VCR CONFERENCE, one of standards of digital interface of "Specifications of Consumer-Use Digital VCRs using 6.3 mm magnetic tape" December, 1994 HD DIGITAL VCR CONFERENCE.

In this embodiment, a system (hereinafter referred to as DVCPRO25) of 25 Mbps video compression rate, and frame structure is 525/60 (525 scanning lines, 60 Hz) is used among other DIF stream structures.

Figure 9:
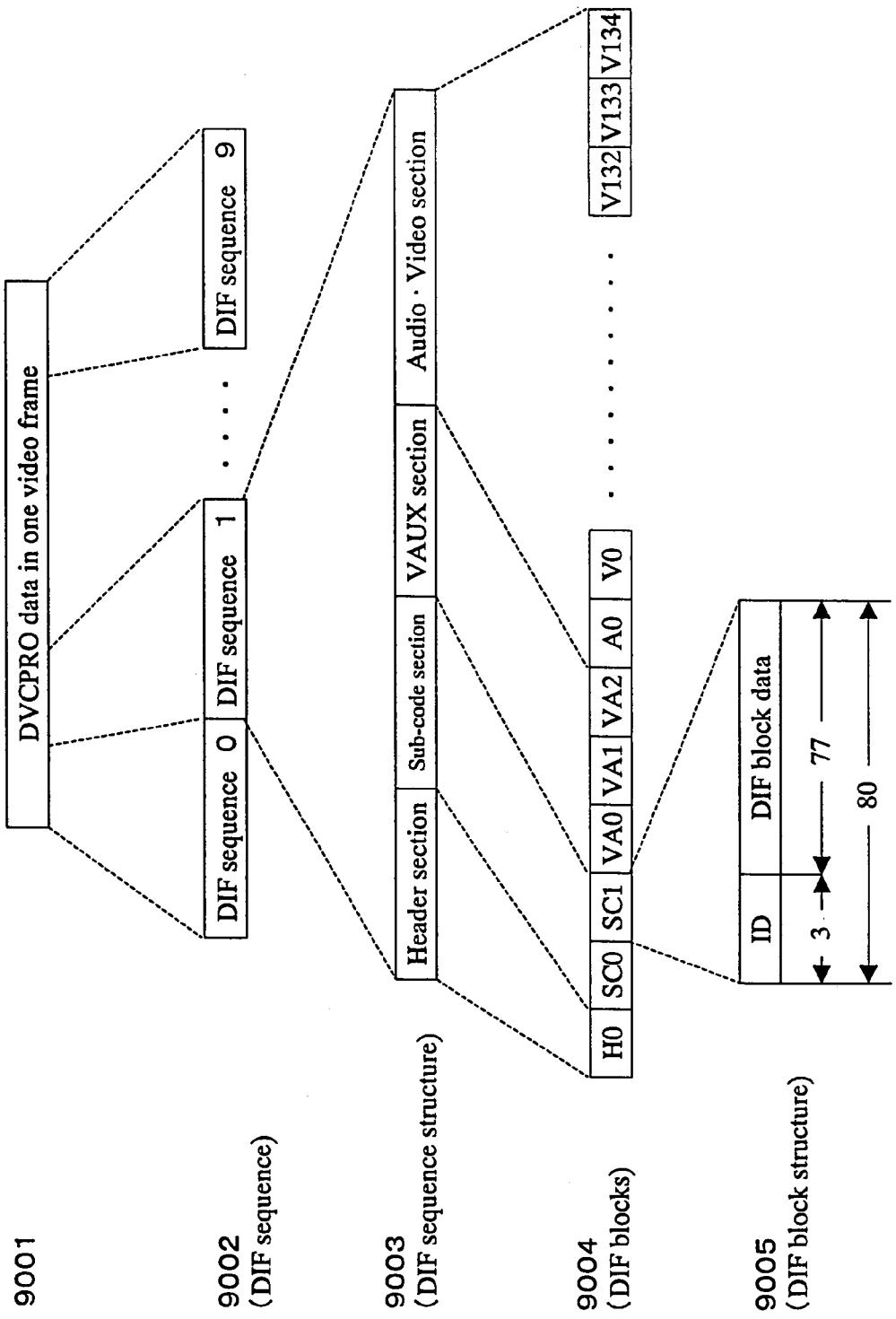
FIG. 9 illustrates a construction of a packet data of DVCPRO25.

FIG. 9 shows a DIF stream of DVCPRO25. In FIG. 9, DIF stream 9001 of one video frame period comprises a plurality of DIF sequences. DIF stream 9001 of one video frame comprises 10 pcs. of DIF sequences 9002.

Each DIF sequence is divided into plural sections responsive to types of stored data. DIF sequence structure 9003 comprises a header section, sub-code section, VAUX section, and audio-video section. Each section is detailed in 9004 of FIG. 9. Each section equally comprises packets having a regular length of 80 bytes, this packet being referred to as DIF block 9005.

Figure 1:
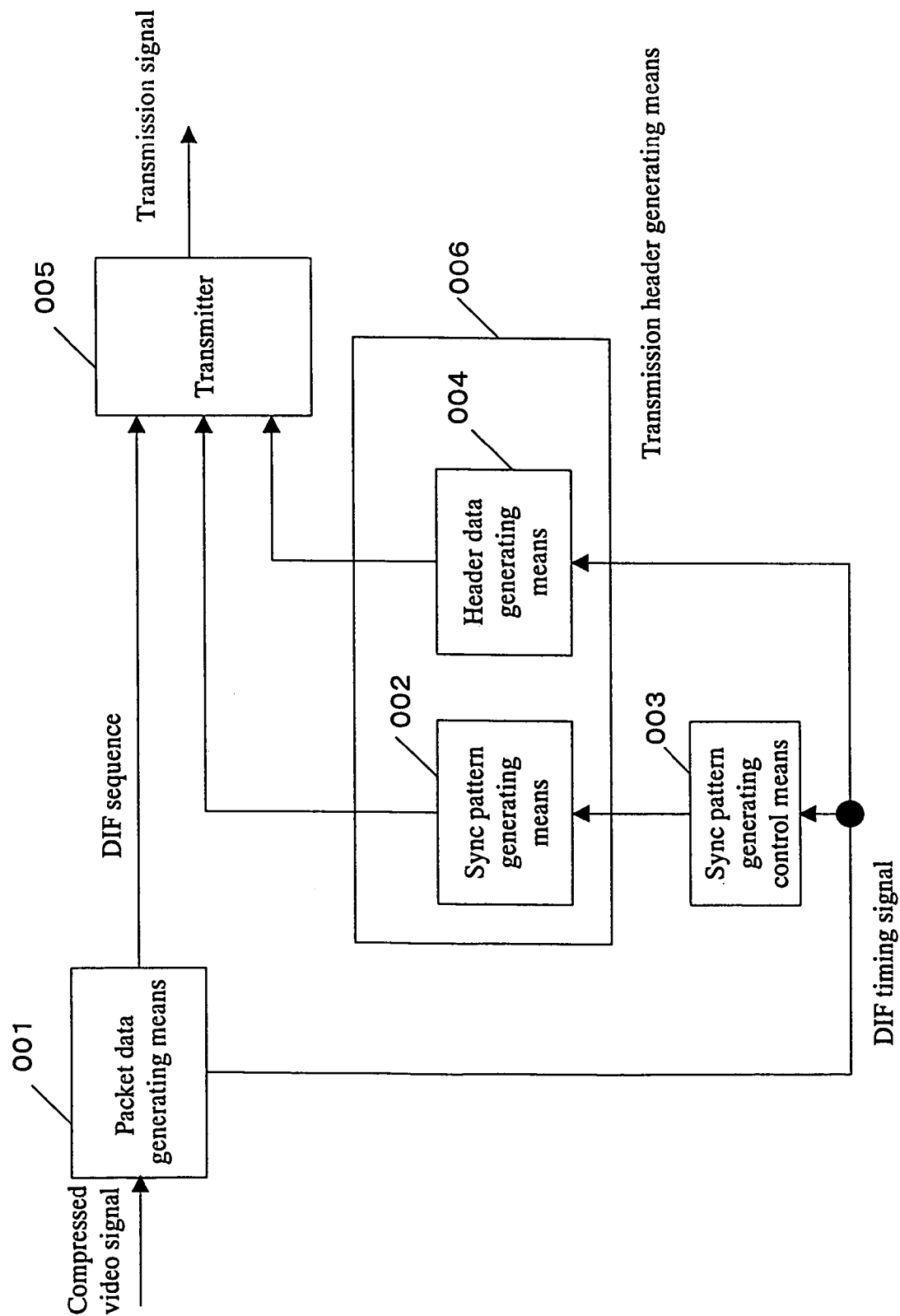
FIG. 1 is a block diagram illustrating a transmitting method in accordance with a first exemplary embodiment of the present invention.

FIG. 1 is a block diagram of a communication method in accordance with this first embodiment. In FIG. 1, packet data generating means 001 generates a DIF sequence and a timing signal, i.e. reference timing signal of the DIF sequence, both shown in FIG. 9, from an input compressed video signal. Sync pattern generating means 002 generates a sync pattern for transmission following the control by sync pattern generating control means 003. Transmission means 005 transmits a signal supplied from sync pattern generating means 002 and header data generating means 004. The heart of the present invention lies in sync pattern generating means 002 and sync pattern generating control means 003.

Figure 2:
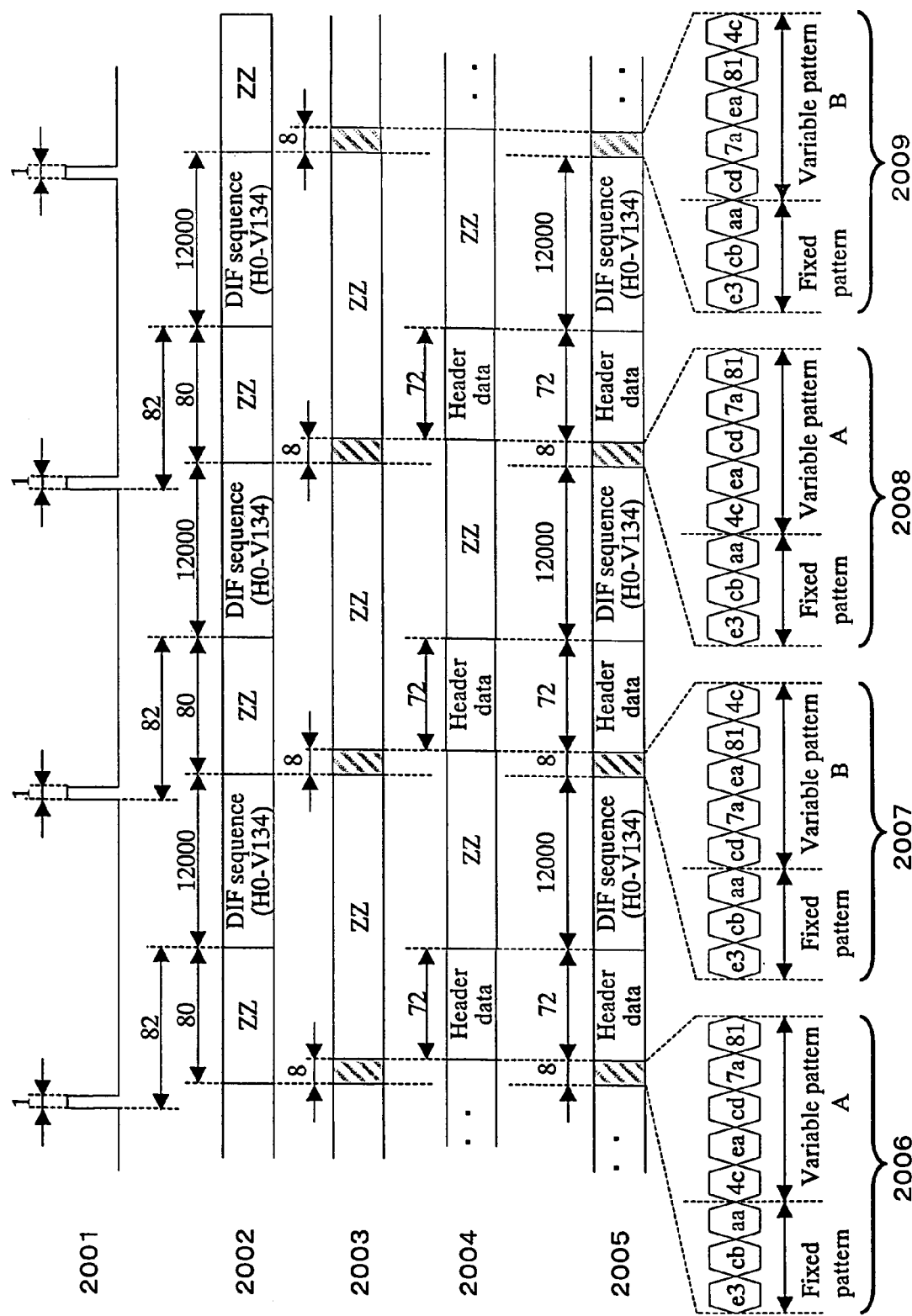
FIG. 2 is a timing chart of the communication method shown in FIG. 1.

FIG. 2 is a timing chart of the communication method of the present invention. An operation of the circuit shown in FIG. 1 is described with reference to FIG. 2. In the description, a high level and low level of logic signal is expressed by 'H' and 'L' respectively, and a high-impedance state by 'ZZ'.

DIF sequence 2002 is tapped off from packet data generating means 001, and is the same as the DIF sequence shown in FIG. 9. DIF timing signal 2001 advances by 82 clocks from a head of effective data of DIF sequence and turns to 'H' only for one clock at given intervals.

Sync pattern 2003 generated by sync pattern generating means 002 hatches a sync pattern section. Header data 2004 is supplied from header data generating means 004. Transmission signal 2005 is tapped off from transmitting means 005. Sync patterns of signal 2005 are detailed in 2006, 2007, 2008 and 2009. In this first embodiment, two types of sync patterns are used.

Sync pattern 2006 (hereinafter referred to as sync pattern A) consists of 8 bytes combining 3 bytes (m=3, one word=one byte) of fixed pattern with 5 bytes (n=5) of variable pattern (hereinafter referred to as variable pattern A). Sync pattern 2007 (hereinafter referred to as sync pattern B) is formed of 3 bytes of fixed pattern and 5 bytes of variable pattern (hereinafter referred to as variable pattern B). 2008 indicates sync pattern A and 2009 indicates sync pattern B. In other words, sync pattern A and sync pattern B alternate in this embodiment. In 2006, 2007, 2008 and 2009, fixed pattern is formed of 'e3cbaa', variable pattern A is formed of '4ceacd7a81' and variable pattern B 'cd7aea814c' (all are expressed in hexadecimal notation).

These regular and variable patterns are determined based on the following basis. In general, compressed video data such as DIF stream uses variable length code (VLC code), and therefore, the data is random data. In order to reduce the probability of pseudo sync in the random data, a longer sync pattern is advantageous. However, the shorter sync pattern is desirable from the view point of reducing redundancy as well as simplifying processing circuitry.

A permissible probability of pseudo sync in a professional use is no more than once in 10,000 years. Computer simulation for finding the sync pattern length satisfying this condition results in 8 bytes. Because 3 bytes are assigned to a fixed pattern length as same as an ID of DIF block data, 5 bytes is assigned to a variable pattern.

In the DIF stream, fixed patterns and variable patterns are selected so that sections where data regularly occurs differ from the sync patterns in bit-structure as much as possible.

DIF block ID is one of the sections where fixed data occur in the DIF stream. Further, fixed data tend to occur at H0, SC0, SC1, VAUX and audio auxiliary data included in audio data in sections where a DIF block ID is connected.

Consecutive 3 bytes extractable from these sections where fixed data tend to occur and every possible combinations of 3 bytes in a DIF stream are compared. Then 'e3cbaa' is selected as a fixed pattern because this has the most different bit-structure and the least probability of pseudo sync pattern.

Further, consecutive 5 bytes from the sections and every possible combinations of 5 bytes in a DIF stream are compared. Then '4ceacd7a81' and 'cd7aea814c' are selected as variable patterns because these two have the most different bit-structure, the least probability of pseudo sync pattern, and also easiness of a variable-pattern-occurrence is considered.

These variable patterns can occur just by changing the order of combining the bytes therein and yet cannot occur just by shifting one of these two variable patterns.

Figure 3:
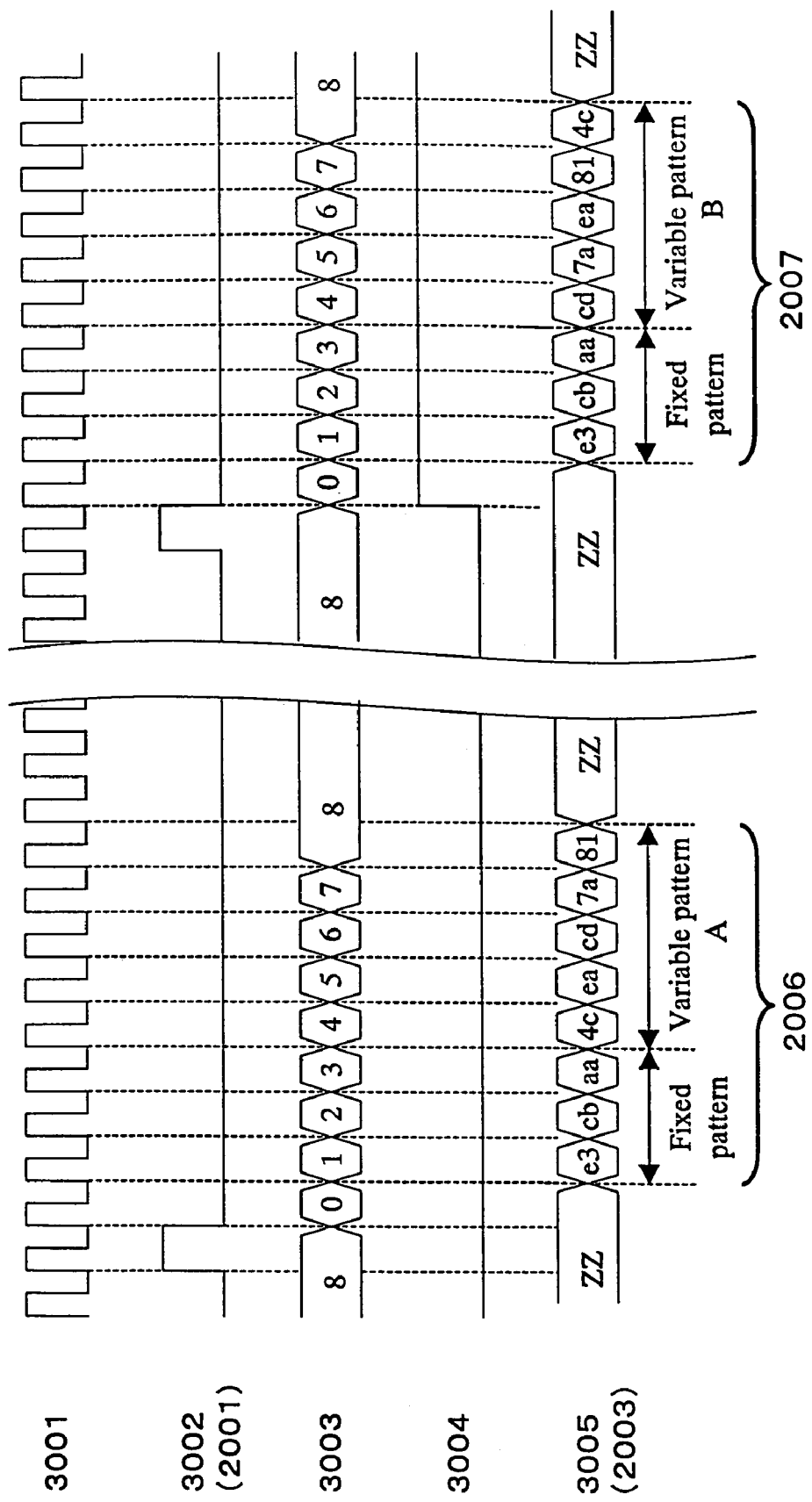
FIG. 3 is a timing chart illustrating a control-timing-relation between sync pattern generating control means and sync pattern generating means.

FIG. 3 is a timing chart illustrating a control-timing-relation between sync pattern generating control-means 003 and sync pattern generating-means 002. FIG. 3 details a control signal supplied to generating-means 002 from control-means 003 as well as a sync pattern supplied from generating-means 002.

In FIG. 3, clock 3001 operates the entire circuit shown in FIG. 1. DIF timing signal 3002 is the same as 2001 shown in FIG. 2. Control signals 3003 and 3004 are supplied from control-means 003 to generating-means 002. Control signal 3003 is reset to zero (0) at the clock next to the logic level H of DIF timing signal 3002, and is counted up every clock as a counter until it reaches to eight (8) from which the signal keep remaining at 8. Control signal 3004 reverses at the clock next to the logic level H of DIF timing signal 3002, i.e. signal 3004 reverses at every DIF sequence. Sync pattern generating-means 002 generates the sync patterns 3005 (the same as 2003 shown in FIG. 2) responsive to control signals 3003 and 3004.

Sync pattern generating-means 002 outputs the fixed pattern 'e3cbaa' at the clock next to 0, 1, 2 of control signal 3003, and outputs the variable pattern A '4ceacd7a81' at the clock next to 3, 4, 5, 6, or 7 of control signal 3003 and when control signal 3004 stays logic level L. When control signal 3004 stays at logic level H and control signal 3003 takes a value of 3, 4, 5, 6, or 7, generating-means 002 outputs variable pattern B 'cd7aea814c' at the clock next to the respective values. Sync pattern generating-means 002 repeats these operations thereby outputting sync pattern A and sync pattern B alternately as signal 2003. The control method shown in FIG. 3 is an example and other control methods may be used.

Figure 10:
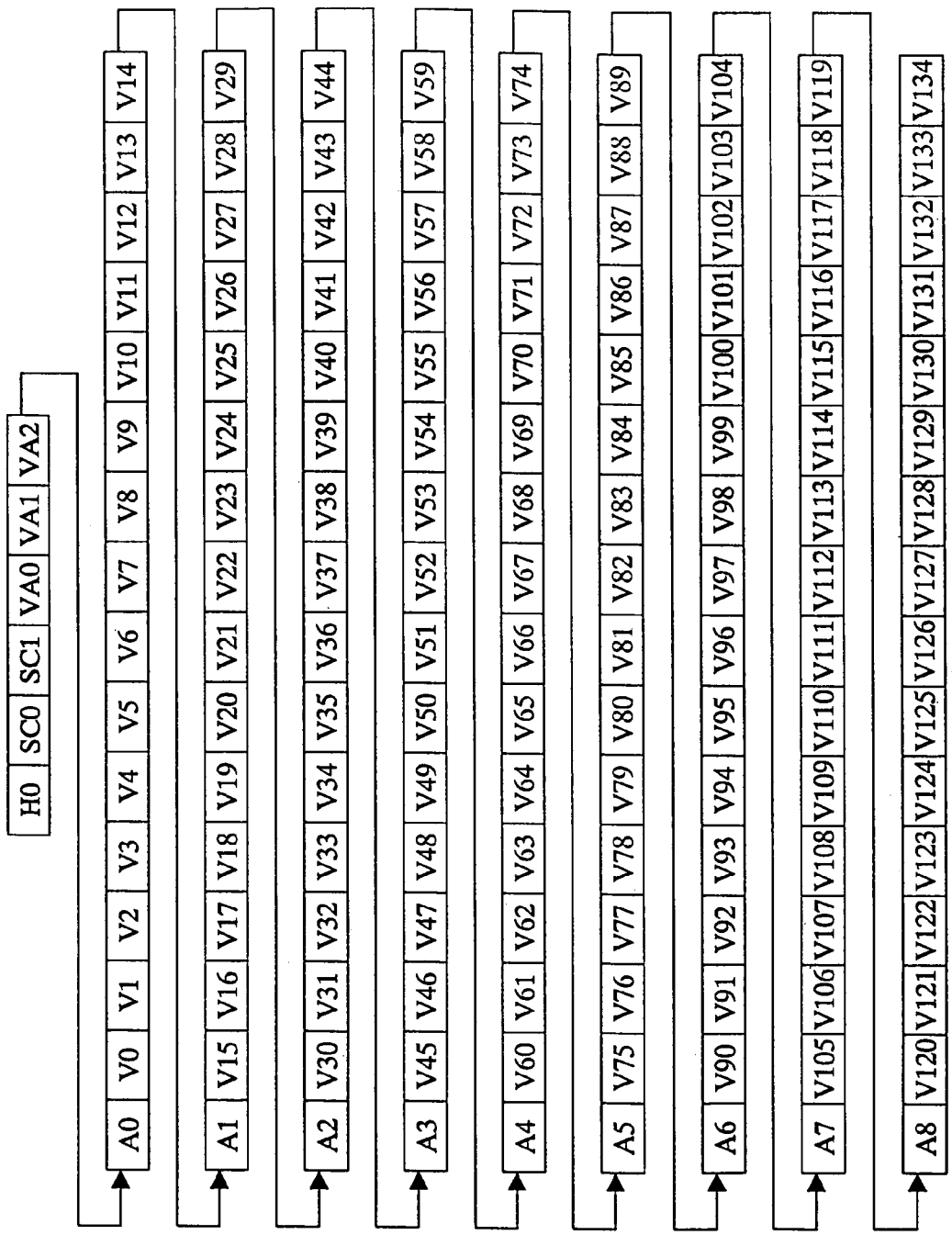
FIG. 10 illustrates DIF block rows.

FIG. 10 details DIF block sequence. In FIG. 10, reference marks are assigned to the following meanings:

H0=header DIF block;
SC0, SC1=sub-code DIF block;
VA0, VA1, VA2=video auxiliary DIF (video AUX) block (VAUX);
A0, A1 . . . A8=audio DIF block; and
V0, V1, . . . V134=video DIF block.

In other words, the alphabetic letters of each DIF block represent section types of the DIF blocks, and numeric digits represent the DIF block numbers of respective section types. Each DIF block has 80 bytes length as shown by 9005.

Each block includes the data as follows:

Header DIF: control data about the DIF sequence

Audio DIF block: audio data and auxiliary data about the audio

Video DIF block: video data

Video auxiliary DIF block (VAUX): auxiliary data about the video

Sub-code DIF block: other additional data

Figure 11:
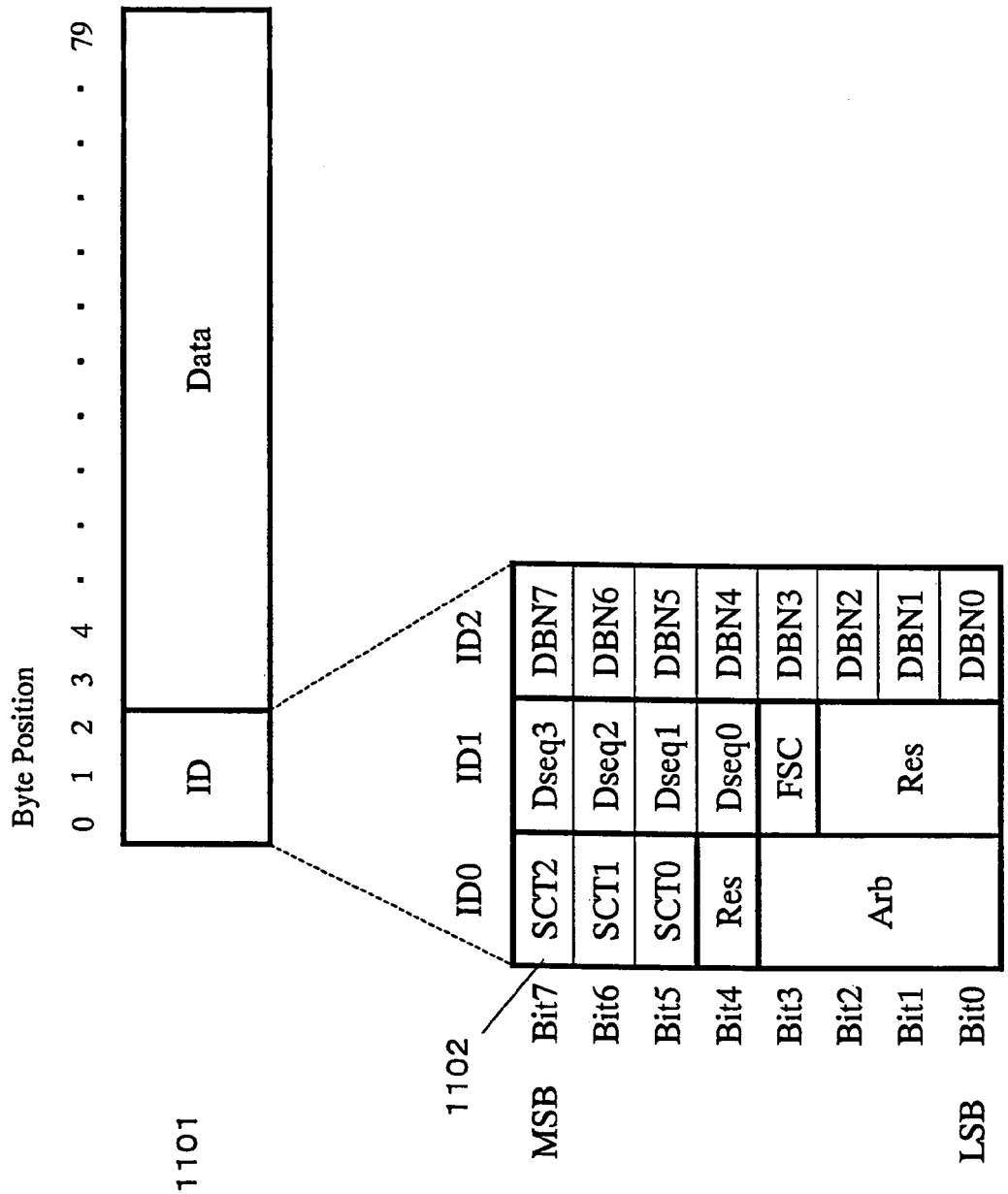
FIG. 11 is a schematic diagram of the DIF block.

FIG. 11 is a schematic diagram of the DIF block. DIF block 9005 shown in FIG. 9 is detailed hereinafter with reference to FIG. 11. DIF block 1101 in FIG. 11 is a packet having a regular length of 80 bytes. Heading 3 bytes includes DIF block ID, and remaining 77 bytes stores data. DIF block ID 1102 details itself and its heading bytes and onward are assigned to ID0, ID1, and ID2 in this order.

Bits 7-5 (SCT2, SCT1, SCT0) of ID0 represent a section type of the DIF block. Table 1 shows correspondence between the values of SCT2, SCT1, SCT0 and the section types.

TABLE 1

| SCT2 | SCT1 | SCT0 | section type |
|------|------|------|--------------|
| 0 | 0 | 0 | header section |
| 0 | 0 | 1 | sub-code |
| 0 | 1 | 0 | VAUX |
| 0 | 1 | 1 | audio |
| 1 | 0 | 0 | video |
| 1 | 0 | 1 | reserved |
| 1 | 1 | 0 | |
| 1 | 1 | 1 | |

'000' represents a header, '001' represents a sub-code, '010' VAUX, '011' audio, '100' video, and '101', '110', '111' represent reserves. In other words, the section types in the IDs of DIF blocks shown in FIG. 10 are expressed as follows:

H0:'000', SC0 and SC1: '001', VA0, VA1 and VA2: '010', A1, A2, ... A9: '011', V0, V1, ... V134: '100'. Alphabetic letters represent the section types as previously discussed. Reserved code is reserved in the standard specification; however, they are not practically used.

Bits 7-4 (Dseq3, Dseq2, Dseq1, Dseq0) of ID0 represent DIF sequence No. to which the DIF block belongs. Table 2 shows correspondence between the values of Dseq3, Dseq2, Dseq1, Dseq0 and the DIF sequence Nos.

TABLE 2

| Dseq3 | Dseq2 | Dseq1 | Dseq0 | |
|-------|-------|-------|-------|---|
| 0 | 0 | 0 | 0 | DIF sequence No. 0 |
| 0 | 0 | 0 | 1 | DIF sequence No. 1 |
| 0 | 0 | 1 | 0 | DIF sequence No. 2 |
| 0 | 0 | 1 | 1 | DIF sequence No. 3 |
| 0 | 1 | 0 | 0 | DIF sequence No. 4 |
| 0 | 1 | 0 | 1 | DIF sequence No. 5 |
| 0 | 1 | 1 | 0 | DIF sequence No. 6 |
| 0 | 1 | 1 | 1 | DIF sequence No. 7 |
| 1 | 0 | 0 | 0 | DIF sequence No. 8 |
| 1 | 0 | 0 | 1 | DIF sequence No. 9 |
| 1 | 0 | 1 | 0 | not used |
| 1 | 0 | 1 | 1 | |
| 1 | 1 | 0 | 0 | |
| 1 | 1 | 0 | 1 | |
| 1 | 1 | 1 | 0 | |
| 1 | 1 | 1 | 1 | |

DIF sequence No. begins with 0 and ends with 9, thus total 10 values correspond to the DIF sequence Nos., and remaining values are not used. The DIF blocks belonging to a DIF sequence have the same DIF sequence No., i.e., all the 150 DIF blocks shown in FIG. 10 have identical DIF sequence No. DIF sequence No. '0' is assigned to all the DIF blocks in DIF sequence 0 having reference mark 9002, and DIF sequence No. '1' is assigned to all the DIF blocks in DIF sequence 1, and the number is incremenatal onward.

ID2 (DBN7, DBN6, DBN5, DBN4, DBN3, DBN2, DBN1, DBN0) represents each DIF block No. of respective section types in a DIF sequence. To be more specific, the block Nos. are assigned to respective section types as follows:

H0='00h', SC0='00h', SC1='01h', VA0='00h', A1='01h', VA2='02h', A0='00h', A1='01h', A2='02h', A3='03h', A4='04h', A5='05h', A6='06h', A7='07h', A8='08h', A9='09h', V0='00h', V1='01h', ... V134='86h' ('134d'). In other words, numeric digits in FIG. 10 are the DIF block Nos. In this description, 'h' stands for a hexadecimal notation, and 'd' stands for a decimal notation. Table 3 shows correspondences between the DIF block Nos. and DBN7, DBN6, DBN5, DBN4, DBN3, DBN2, DBN1, DBN0.

TABLE 3

| DBN7 | DBN6 | DBN5 | DBN4 | DBN3 | DBN2 | DBN1 | DBN0 | |
|------|------|------|------|------|------|------|------|---|
| 0 | 0 | 0 | 0 | 0 | 0 | 0 | 0 | DIF Block No.0 |
| 0 | 0 | 0 | 0 | 0 | 0 | 0 | 1 | DIF Block No.1 |
| 0 | 0 | 0 | 0 | 0 | 0 | 1 | 0 | DIF Block No.2 |
| 0 | 0 | 0 | 0 | 0 | 0 | 1 | 1 | DIF Block No.3 |
| . | . | . | . | . | . | . | . | |
| . | . | . | . | . | . | . | . | |
| 1 | 0 | 0 | 0 | 0 | 1 | 1 | 0 | DIF Block No.134 |
| 1 | 0 | 0 | 0 | 0 | 1 | 1 | 1 | not used |
| . | . | . | . | . | . | . | . | |
| . | . | . | . | . | . | . | . | |
| 1 | 1 | 1 | 1 | 1 | 1 | 1 | 1 | not used |

A video section has the greatest number of DIF blocks, i.e. 135 blocks, and the greatest DIF block No. is 134. The number '87h' ('135d') and onward are thus not used.

ID0's bit 4 and ID1's bits 2-0 are reserved bits and thus not used. Default value is 1. FSC of ID1 is used when the video compression rate is 50 Mbps, and takes either 0 or 1. In this embodiment, 25 Mbps is used as an example and in this case, FSC takes always 0. Bits 3-0 of ID0 takes 0 or 1 arbitrarily.

As such, some numbers are not used in section types, DIF sequence Nos. and DIF block Nos. in a DIF stream.

Figure 4:
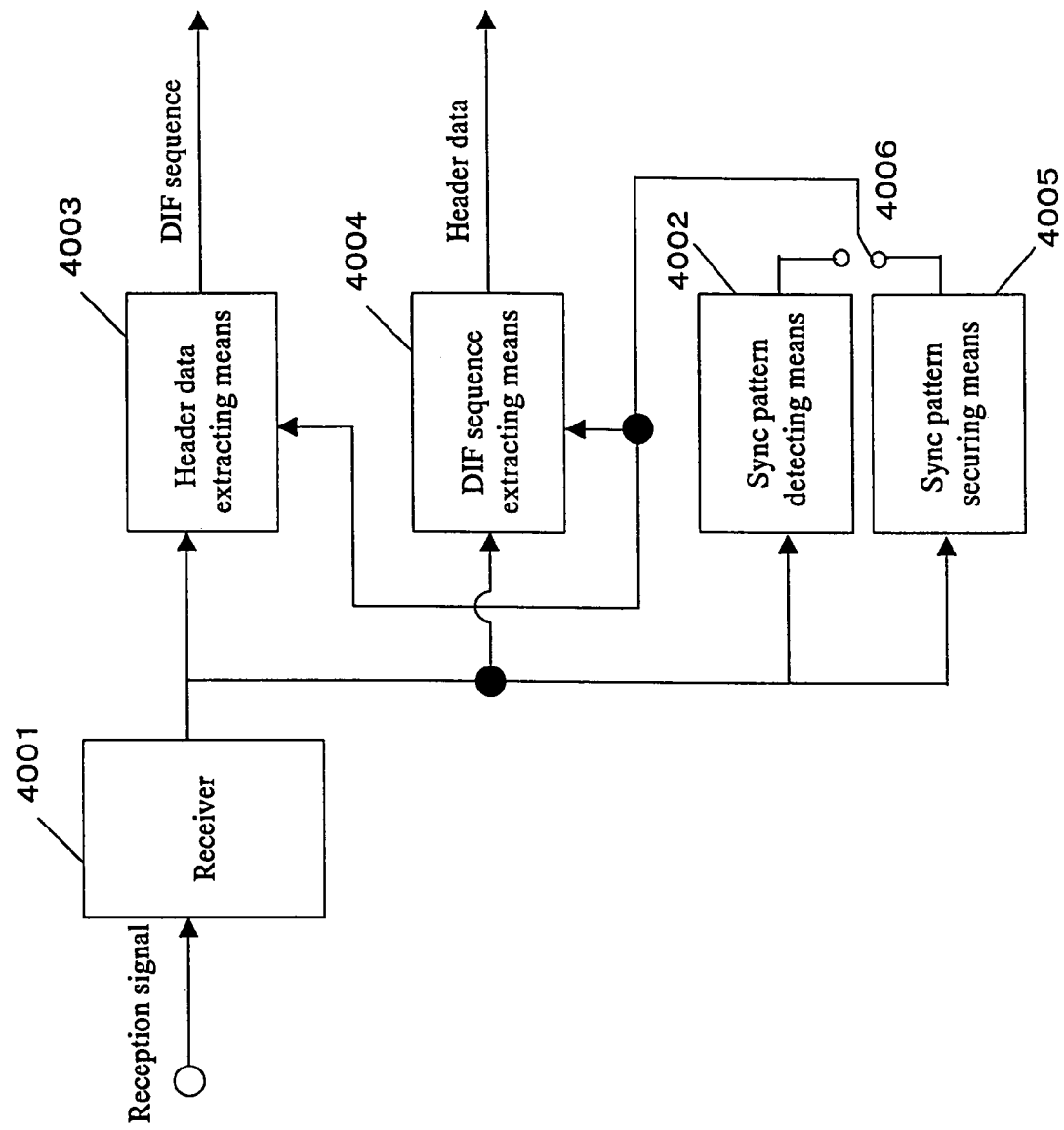
FIG. 4 is a block diagram of a receiving apparatus in accordance with the second exemplary embodiment.

A structure and an operation of a receiving apparatus are demonstrated hereinafter. FIG. 4 is a block diagram of a receiving apparatus circuit. In FIG. 4, receiving means 4001 receives data (2005 in FIG. 2) transmitted from transmitting means 005 shown in FIG. 1. An output from receiving means 4001 is supplied to sync pattern detector 4002, header data extracting means 4003 and DIF sequence extracting means 4004 respectively.

Figure 5:
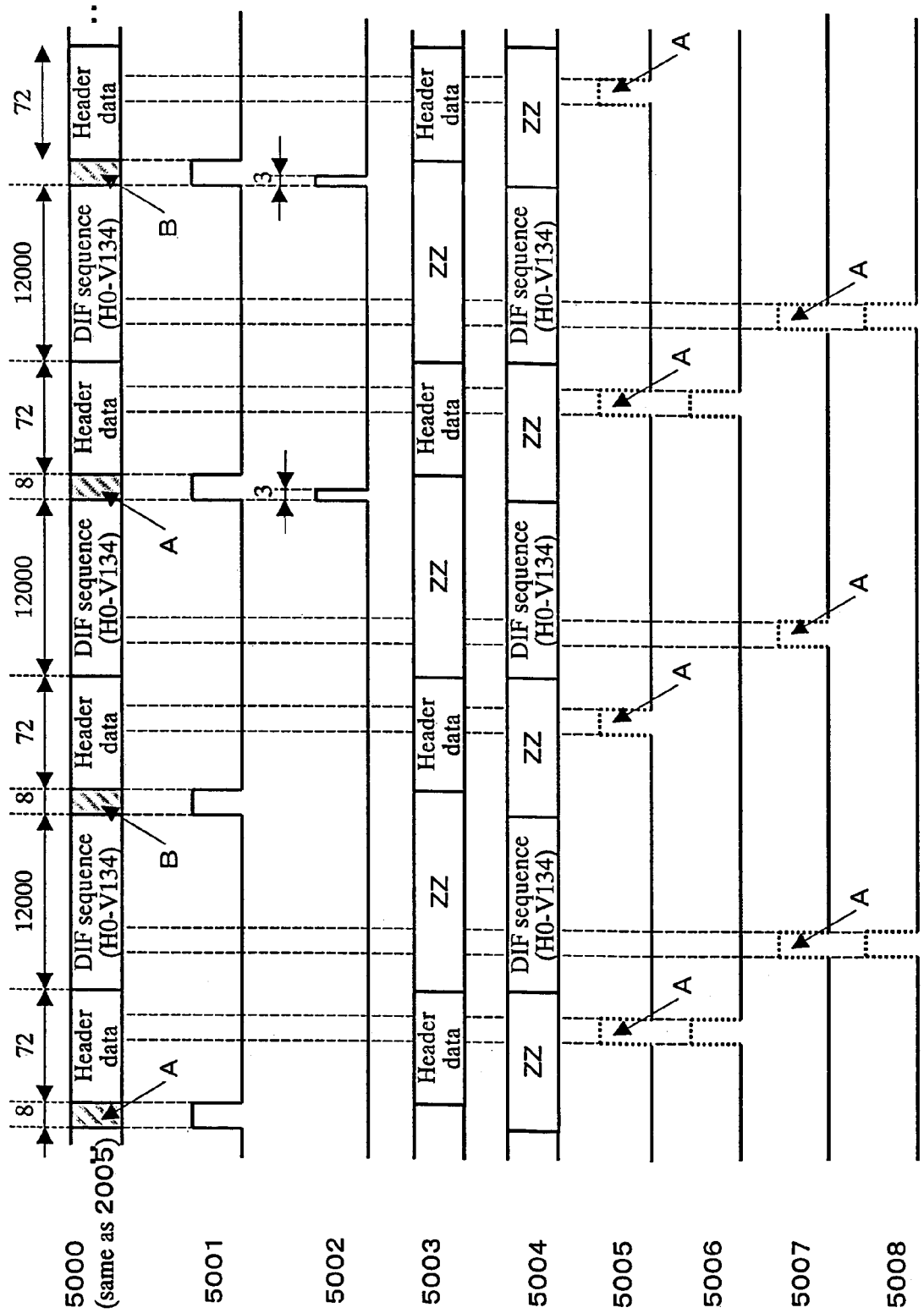
FIG. 5 is a timing chart illustrating an operation of the receiving apparatus shown in FIG. 4.

FIG. 5 is a timing chart illustrating an operation of the receiving apparatus. Sync pattern detecting means 4002 detects a sync pattern from signal 5000 (the same as 2005 in FIG. 2, it is transmitted by transmitting means 005 and arrives at receiving means 4001) received by receiving means 4001. Before the sync pattern is detected, switch 4006 is coupled to sync pattern detecting means. After the sync pattern is detected, sync pattern securing means 4005 functions whereby switch 4006 is coupled to the securing means and operates a flywheel action. Further, securing means generates a reference signal for header data extracting means 4003 and DIF sequence extracting means 4004.

In signal 5000, as arrow marks with 'A' and 'B' point, sync patterns A and B are alternately superimposed on the signal. When detecting means 4002 and securing means 4005 detect the two sync patterns alternately, these two means generate a reference signal 5001. Based on this reference signal, header extracting means 4003 measures timing with a counter mounted therein, and extracts and outputs a header data at the timing the header data has been input (5003). Based on this signal 5003, DIF sequence extracting means 4004 counts a timing with a counter mounted therein, and extracts and outputs the DIF sequence data at the timing the DIF sequence data is input (5004).

As an example, assume that a pseudo sync pattern is inserted into a header data. When a regular address, such as a source address or a target address, is input into a header data, a pseudo sync pattern appears at fixed intervals in every header data of signal 5000 if the regular data is longer than the sync pattern (in this embodiment, sync pattern has 8-byte length). Signal 5005 illustrates that the same pattern as the sync pattern appears in every header data. Sync pattern detecting means 4002 detects sync pattern A every header data; however, in this embodiment, sync pattern A alternates with sync pattern B. Because sync pattern B is not detected after sync pattern A in a given timing, the sync pattern is detected every other place as signal 5006 illustrates, which is determined to be an irregular detection. Thus securing operation (flywheel action) is not activated at this timing, and sync-pattern-securing-means 4005 is prevented from generating a reference signal at a wrong timing to header-data-extracting means 4003 as well as to DIF sequence extracting means 4004.

In the same manner, a sync pattern can be incidentally inserted into a DIF sequence. For instance, when video signals change only little between frames, or a compression data incidentally becomes a sync pattern in a DVCPRO video compression format, the sync patterns appear at fixed intervals. However, in this case, as signal 5007 illustrates, the sync patterns are detected at every DIF sequence, sync pattern A alternates with sync pattern B. Because sync pattern B is not detected after sync pattern A in a given timing, the sync pattern is detected every other place as signal 5006 illustrates, which is determined to be an irregular detection. Thus securing operation (flywheel action) is not activated at this timing, and sync-pattern-securing-means 4005 is prevented from generating a reference signal at a wrong timing to header-data-extracting means 4003 as well as to DIF sequence extracting means 4004.

An operation of the sync security in this first embodiment is hereinafter demonstrated. Signal 5002 illustrates a window of the flywheel action, i.e. a securing operation (window is opened at logic H). The sync security starts working at the first two sync patterns shown in signal 5001, and the third sync pattern and onward examine whether or not an input data is a sync pattern only when the window opens. In general, the flywheel action uses a window having the same length as the sync pattern in order to detect the sync pattern. In this embodiment, two sync patterns, i.e. patterns A and B, are used. The leading 3-bytes have fixed patterns, and the same patterns thus always appear at 3-bytes where the window opens. Therefore, it is enough to examine the input data with the windows of 3-bytes, which shortens the examining period, and since the examining pattern is a fixed pattern, which allows the flywheel action to function in a substantially simple circuit.

In other words, the present invention allows using a plurality of sync patterns to avoid a pseudo sync pattern being used for erroneous synchronization even when the pseudo sync patterns appear at fixed positions in data. As a result, only normal sync patterns are secured against losing sync, and a safety communication can be provided.

This is another advantage of the present invention using a plurality of sync patterns, i.e. part of the patterns are fixed patterns so that sync pattern generating means 002 can be constructed by rather simple circuitry. The receiving apparatus of the present invention allows the sync security action to be practiced with ease, therefore, sync pattern detecting means 4002 and sync pattern securing means 4005 can be also constructed by simple circuitry.

In this embodiment, the byte (word) of the variable pattern A is '4ceacd7a81' and that of the variable pattern B is 'cd7aea814c' which is just changed in the order of pattern A. This allows a ROM to be small in capacity when sync pattern generating means 002 generates a pattern therein using the ROM, and yet, only changing an order of reading from the ROM accommodates both of patters A and B. As a result, substantially small circuitry as a whole can function. When a combinational circuit generates a pattern, not to mention, the circuit can be constructed by a small circuitry. Sync pattern detecting means 4002 and sync pattern securing means 4005 can be also constructed by simple circuitry.

A fixed pattern of 3-bytes is used as part of the sync pattern, thus a structure of 8×2-3=13-bytes effects two types of sync pattern, i.e. 8×2=16-bytes. Further, the variable pattern comprises 5-bytes combined, thus the pattern actually structured by 8-bytes, which effects 16-bytes. In other words, a sync pattern having less number of bits and a simple circuit can realize a reliable synchronization, which assures a safety communication.

FIG. 4 illustrates a receiving apparatus of the present invention; however, a transmitting apparatus and a method of transmitting are effective not only to the receiving apparatus shown in FIG. 4 but also to every case where a pseudo sync pattern may appear.

In this embodiment, header data and DIF sequence as data to be transmitted are used for demonstration. In general, the header data stores a sequence No. per transmittance unit (DIF sequence in this case) a source address, a target address and other information for transmitting. Many of these data are regular data, and a pseudo sync tends to appear in these data; however, these data are not essential to the present invention. When the header data is not available, header data generating means 004 is omitted from FIG. 1.

In this embodiment, the sync pattern shown in FIG. 2 is used; however, the sync pattern is not limited to this one because a plurality of variable patterns formed by combining regular and variable patterns are used, which is a key of the present invention. Therefore, the data structure may be derived from other sources.

In this embodiment, the sync pattern comprises a fixed pattern of 3-bytes and two variable patterns of 5-bytes each; however, the numbers of data (bytes) are not limited to this pattern, and regarding the variable pattern, as long as plural types of variable patterns are available, a number of types is not limited. The fixed pattern is arranged before the variable pattern; however, it can be disposed after the variable pattern, or the data of both the patterns can be disposed at random.

In this embodiment, a DIF timing signal is used to express a timing of a DIF sequence; however, a specific code expressing the timing can be superimposed in the DIF sequence so that the DIF sequence can be properly timed.

Exemplary Embodiment 2

Figure 6:
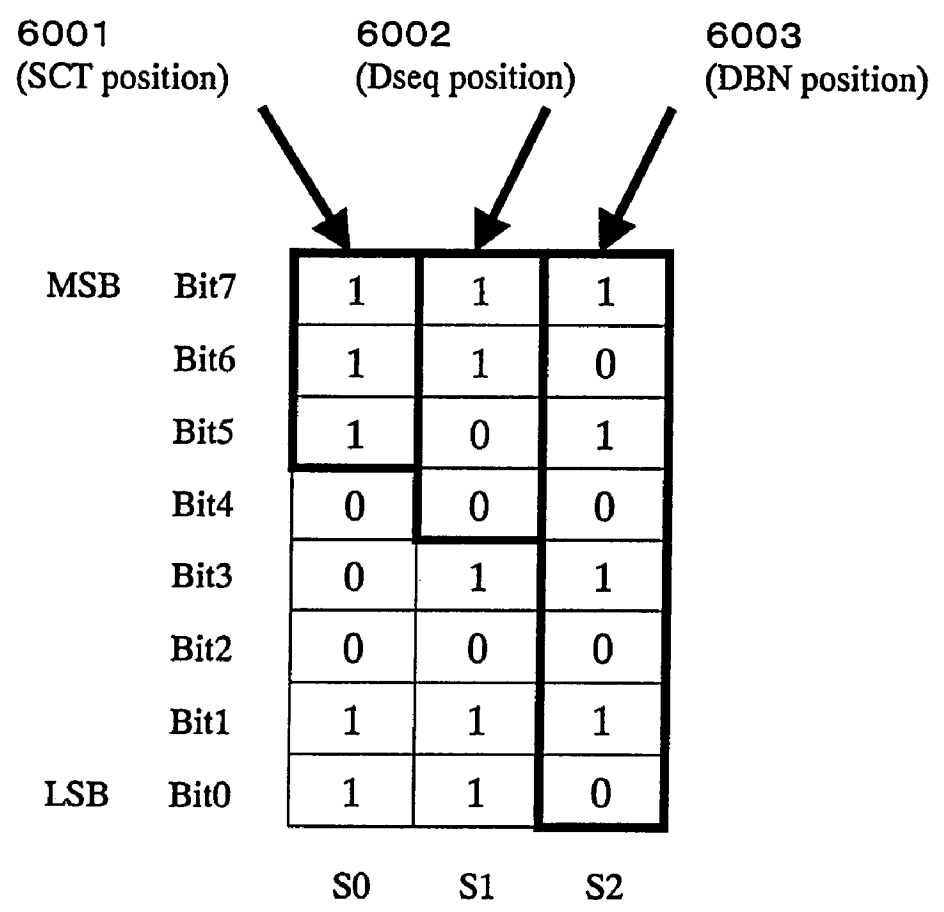
Figure 7:
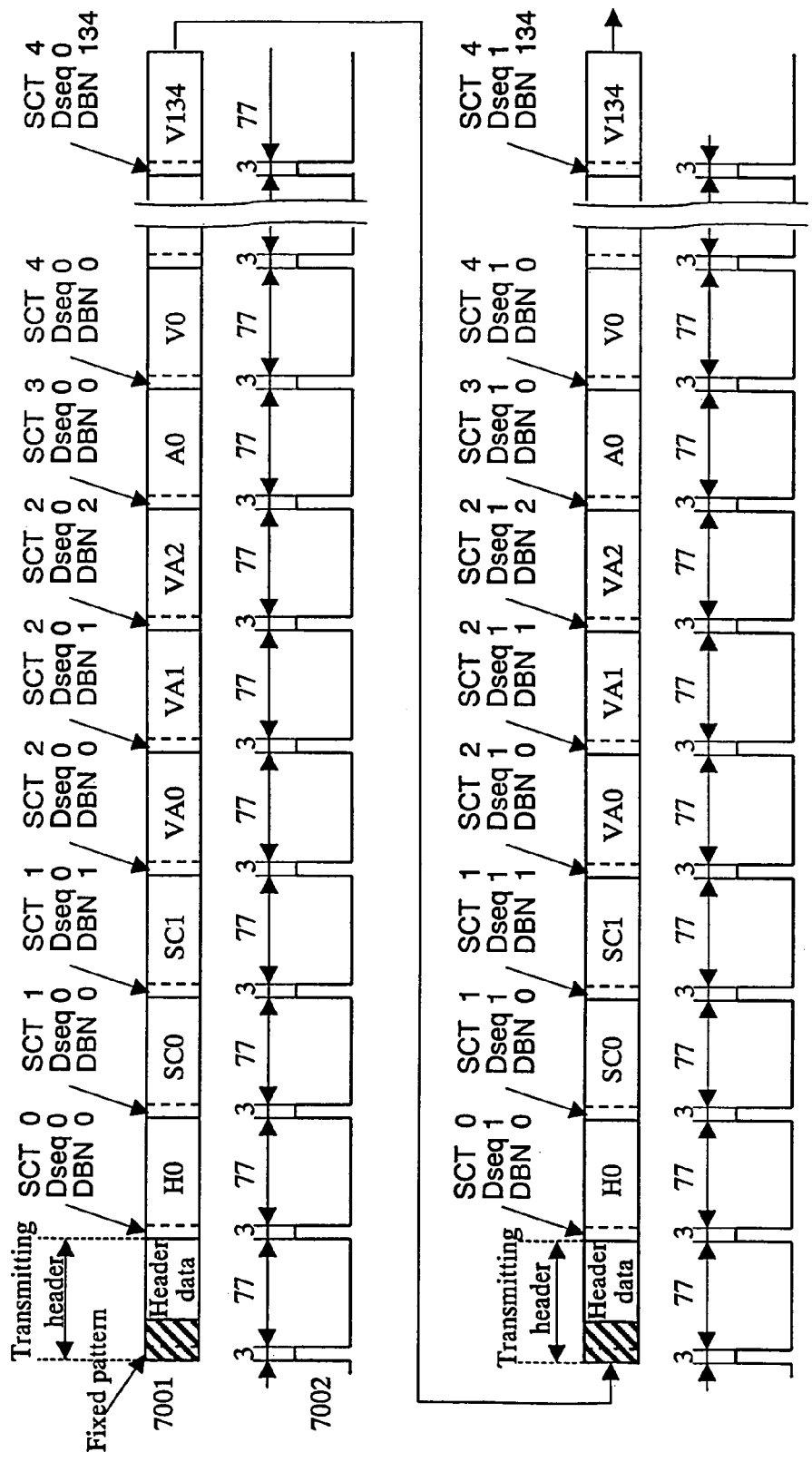
FIG. 7 is a timing chart for sync security of sync pattern securing means in accordance with the second embodiment of the present invention.

The second exemplary embodiment of the present invention is demonstrated hereinafter with reference to FIGS. 6, 7 and 8. The previous embodiment proved that the pseudo sync pattern was avoidable by the flywheel action with reference to FIG. 4. In the previous embodiment, the windows opened every time when the sync pattern appeared. In this second embodiment, the windows are arranged at narrower intervals so that the sync can be secured in a more reliable manner.

In this second embodiment, a transmission header-comprising a sync pattern and a header data-contains 80 bytes=t (t=s×k; s=80, k=1). On the other hand, a leading 3-bytes (r=3) of a DIF block works as an ID of this DIF block, thus a fixed pattern portion of the sync pattern at a top of the transmission header and the DIF block IDs exist every 80 bytes. The inventors direct their attentions to this point, and build a structure allowing the sync patterns to open the windows every 80 bytes so that the sync can be examined. In FIG. 1, sync pattern generating means 002 including header-data-generating-means 004 is referred to as transmission-header-generating means 006.

Fixed pattern portions of sync pattern A (indicated by 2006 in FIG. 2) and sync pattern B (indicated by 2007 in FIG. 2) are 'e3cbaa'. FIG. 6 illustrates a bit-structure of the fixed pattern, and FIG. 11 illustrates a structure of the DIF block ID. Bit-locational relations between the fixed pattern and DIF block are as follows: Bit 7, bit 6 and bit 5 of S0 bytes represented by 6001 corresponds to a location of section type (SCT), bit 7, bit 6, bit 5 and bit 4 of S1 byte represented by 6002 corresponds to a location of DIF sequence (Dseq), and bit 7 through bit 0 of S2 byte represented by 6003 corresponds to a location of DIF block No. (DBN).

According to a sync security of the second embodiment, sync pattern securing means 4005 opens windows of 3-bytes length every 80-bytes in order to examine the syncs. FIG. 7 is a timing chart for sync security of sync-pattern-securing-means 4005 in accordance with this second embodiment.

Sync pattern detecting means 4002 detects a sync, and when the sync security is activated, the detecting means opens a window of 3-bytes length at the fixed pattern and DIF block ID for examining an input data, but closes the windows at other locations, as illustrated by signal 7002. In other words, an action of opening 3-byte window and closing 77-byte window is repeated, so that a fixed pattern, section type (SCT), DIF sequence No. (Dseq) and DIF block No. (DBN) can be examined, as illustrated by signal 7001.

In a first one byte (S0) of the window, bit 7, bit 6 and bit 5 are examined. SCT takes a value listed in table 1, but does not take '111' of this second embodiment. When '111' is detected, the '111' should be a sync pattern, then sync pattern detecting means only examines section-type-codes within a DIF sequence in the order shown in FIG. 10.

In a second byte (S1) of the window, bit 7, bit 6, bit 5 and bit 4 are examined. The 'Dseq' stays the same within the DIF sequence and takes a value listed in table 2, but does not take '1100' of the present invention. When '1100' is detected, the '1100' should be a sync pattern, then sync pattern detecting means 4002 may only examine whether or not 150 numbers of DIF sequence are detected in series.

In a third byte (S2) of the window, bit 7 through bit 0 are examined. DBN takes a value listed in table 3, but does not take '10101010' (aah) of this second embodiment. When '10101010' is detected, this should be a sync pattern, then sync pattern detecting means 4002 may only examine DBNs within a DIF sequence in the order shown in FIG. 10.

The second embodiment allows the sync to be secured at a shorter period, and rules (FIG. 10, Tables 1, 2 and 3) of the DIF block ID are examined, thereby enhancing the sync security. The values that DIF block ID never takes are assigned to the bits of fixed pattern of the sync patterns, so that the sync pattern is distinguishable from the DIF block. As a result, the sync pattern can be detected and secured in the higher reliable manner, and thus a stable communication can be assured.

Further, in this second embodiment, the DIF block ID are examined every DIF block in sync pattern detecting means 4002 and sync pattern securing means 4005. Thus a data of a specific section can be extracted from the data received. When a DIF block ID to be desirably extracted from the specific section is detected, a control signal is sent to DIF sequence extracting means 4004, and extracting means 4004 passes a DIF block of a target section selectively, so that the specific section is extracted. FIG. 8 is a timing chart at extracting a DIF block of the specific section.

Figure 8:
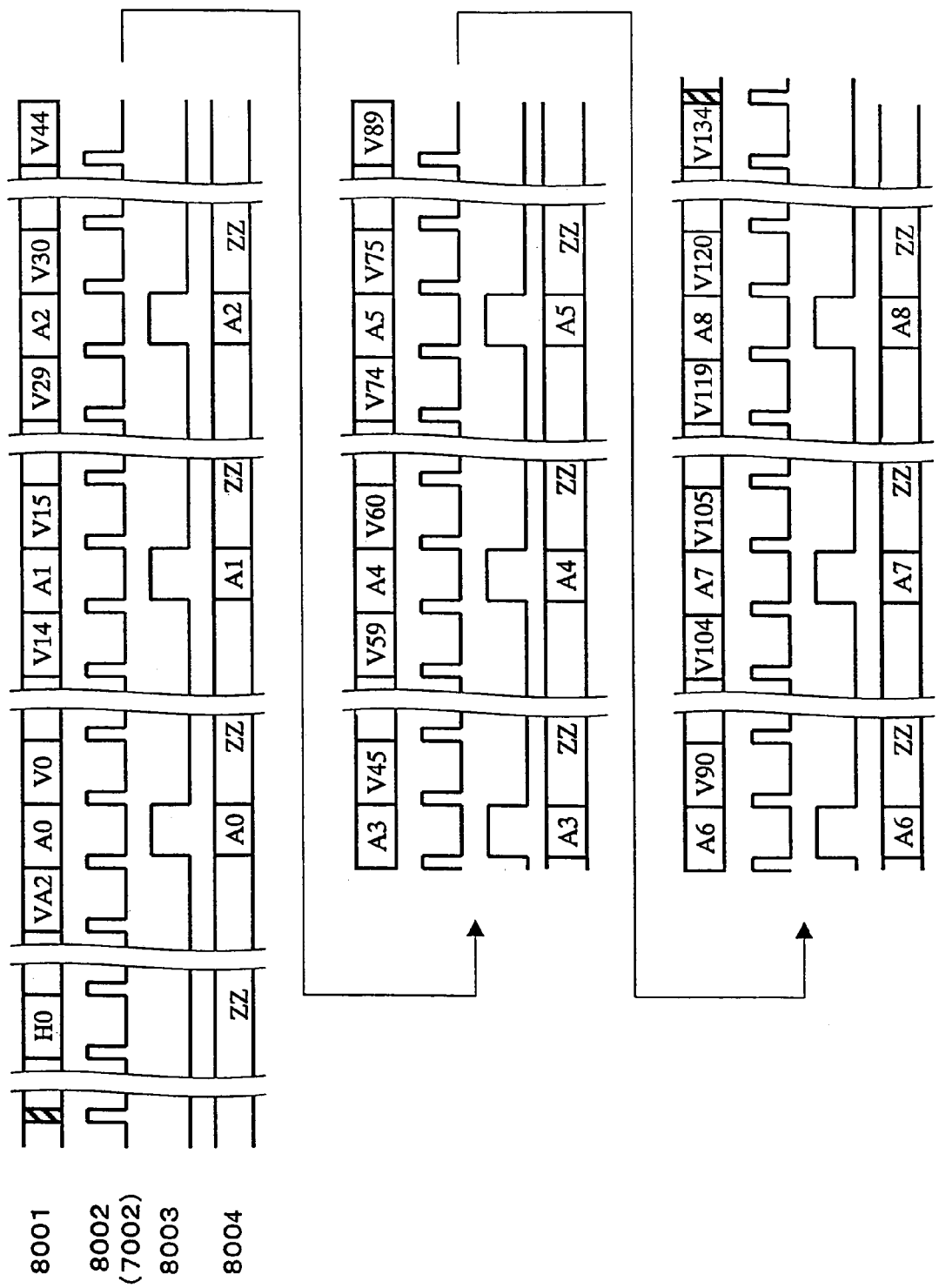
FIG. 8 is a timing chart at extracting a specific DIF block.

In FIG. 8, a signal 8001 is received by receiver 4001. Window 8002 is used by sync pattern securing means 4005 and is the same as signal 7002 shown in FIG. 7. Control signal 8003 examines a section type of signal 8001 supplied at a timing when a window is opened by sync pattern securing means 4005, and turns to logic H only when a signal to be selectively passed is input. Signal 8003 is used by DIF sequence extracting means 4004 as a control signal. DIF sequence extracting means 4004 allows input data 8001 to travel only when this control signal stays at logic H. FIG. 8 shows an example where only an audio signal is selectively travels. In this case, sync pattern securing means 4005 examines bit 7, bit 6, bit 5 (SCT 2, SCT 1, SCT 0) of ID0 at the first one byte of the window. When '011' that is an audio section type listed in table 1 is detected, control signal 8003 turns to logic H in effective data (77 bytes) of the DIF block. DIF sequence extracting means allows selectively effective data of audio DIF block to travel as signal 8004 illustrates.

In this second embodiment, the transmission header contains 80 bytes; however, the transmission header can be added to by a DIF block length (packet data of a regular length) or its multiples, i.e. t=s×k (s=80, k is an integer greater than 1). In such a case, the transmission data is divided into blocks of 80 bytes respectively, and the leading 3-bytes of every block desirably do not show any pattern of the DIF block ID. The DIF block of 80-bytes length is used as an example; however, not to mention, the length is not limited to 80-bytes.

A data transmission route is not specifically defined; however, asynchronous transfer mode (ATM) is preferable. When data is transmitted through ATM, an error correcting code (ECC) for transmission is added to the signal to be transmitted, then the signals are mapped into ATM cells before being transmitted. In this embodiment, data is taken as an example to be transmitted; however, when data is recorded/reproduced to/from a VCR, a disc apparatus or the like, the present invention is applicable.

As discussed above, the present invention realizes a reliable sync detection as well as a reliable sync security using a sync pattern having a less number of bits. As a result, remarkable advantages, such as a stable communication with circuitry in smaller size, can be provided.

INDUSTRIAL APPLICABILITY

A method of transmitting a packet data is disclosed. When a packet data added with a sync pattern is transmitted, a sync pattern of 'q' words ('q'=m+n) is added before transmission. The sync pattern of 'q' words are formed by combining a fixed pattern of 'm' words (m is an integer greater than 0) with a plural types of variable patterns of 'n' words ('n' is an integer greater than 1). In this case, the variable patterns included at least two consecutive packets have different bit-structures, so that the sync pattern having a less number of bits is used for normal sync security and for avoiding a pseudo sync pattern being erroneously secured. As a result, a stable communication is achievable.

The invention claimed is:

1. A method of transmitting data packets, said method comprising the steps of:
   (a) generating a fixed pattern comprising 'm' multibit words ('m' is an integer greater than 0);
   (b) generating variable, non-random patterns of predetermined bit structure, each pattern comprising 'n' words ('n' is an integer greater than 1);
   (c) generating sync patterns comprising 'q' words ('q'=m+n), each of the sync patterns formed by combining the fixed pattern and one of the variable patterns;
   (d) adding one of said sync patterns to each of said data packets in a data stream, wherein consecutive ones of said data packets each have added respectively different variable patterns,
   wherein said sync patterns are limited to two different sync patterns within three immediately consecutive sync patterns in said data stream.

2. The method as defined in claim 1, wherein the fixed pattern comprises three words.

3. The method as defined in claim 2, wherein the three words includes 'eb', 'cb' and 'aa', expressed in a hexadecimal notation.

4. The method as defined in claim 1, wherein the variable pattern comprises five words.

5. The method as defined in claim 4, wherein the five words includes '4c', 'ea', 'cd', '7a' and '81', expressed in a hexadecimal notation.

6. A method of receiving a packet data transmitted by the method defined in claim 1, said method including a step of detecting a sync.

7. A method of receiving a packet data transmitted by the method defined in claim 1, said method including the steps of:
   (a) detecting a sync for examining both of a fixed pattern and a variable pattern of a data received; and
   (b) securing a sync for examining only the fixed pattern, wherein said step (a) processes the data until the sync is secured, and said step (b) processes the data after the sync is secured.

8. A packet data receiving apparatus for receiving the packet data transmitted by the method defined in claim 1, said receiving apparatus comprising:
   (a) means for detecting a sync for examining both of a fixed pattern and a variable pattern of a data received; and
   (b) means for securing a sync for examining only the fixed pattern,
   wherein said means defined in (a) processes the data until the sync is secured, and said means defined in (b) processes the data after the sync is secured.

9. The method as defined in claim 1, wherein the variable pattern comprises a plurality of words, and the variable patterns are made by changing an order of the words.

10. A method of transmitting data packets, said method comprising the steps of:
    (a) generating a fixed pattern comprising 'm' multibit words ('m' is an integer greater than 0);
    (b) generating variable, non-random patterns of predetermined bit structure, each pattern comprising 'n' words ('n' is an integer greater than 1);
    (c) generating sync patterns comprising 'q' words ('q'=m+n), each of the sync patterns formed by combining the fixed pattern and one of the variable patterns;
    (d) adding one of said sync patterns to each of said data packets in a data stream, wherein consecutive ones of said data packets each have added respectively different variable patterns;
    wherein the variable patterns are '4cead7a81' and 'cd7aea814c' expressed in a hexadecimal notation.

11. A packet data transmitting apparatus for transmitting data packets, said transmitting apparatus comprising:
    (a) means for generating a fixed pattern comprising 'm' multibit words ('m' is an integer greater than 0);
    (b) means for generating variable, non-random patterns of predetermined bit structure, each pattern comprising 'n' words ('n' is an integer greater than 1);
    (c) means for generating sync patterns comprising 'q' words ('q'=m+n), each of the sync patterns formed by combining the fixed pattern and one of the variable patterns; and
    (d) means for adding one of said sync patterns to each of said packets in a data stream, wherein said sync patterns are limited to two different sync patterns within three immediately consecutive sync patterns in said data stream.

12. A method of transmitting data packets, wherein the data packets comprise a plurality of blocks, and the blocks include 's' words having a block header of 'm' words, said method comprising the steps of:
    (a) generating a fixed pattern comprising 'm' multibit words ('m' is an integer greater than 0):
    (b) generating variable non-random patterns of predetermined bit structure, each pattern comprising 'n' words ('n' is an integer greater than 1):
    (c) generating sync patterns comprising 'q' words ('q'=m+n), each of the sync patterns formed by combining the fixed pattern and one of the variable patterns;

(d) adding one of said sync patterns to each of said data packets in a data stream, wherein consecutive ones of said data packets each have added respectively different variable patterns; and (e) adding a transmission header of 'sxk' words (k is a natural number), wherein the transmission header is divided into 'k' pieces of blocks at intervals of every 's' words, each block of said 'k' pieces of blocks includes the fixed pattern of 'm' words at a top thereof, the fixed pattern employs a pattern other than patterns used in the block header; and wherein said sync patterns are limited to two different sync patterns within three immediately consecutive sync patterns in said data stream.

13. A method of transmitting data packets, said method comprising the steps of:

(a) generating a fixed pattern comprising 'm' multibit words ('m' is an integer greater than 0);

(b) generating variable, non-random patterns of predetermined bit structure, each pattern comprising 'n' words ('n' is an integer greater than 1);

(c) generating sync patterns comprising 'q' words ('q'=m+n), each of the sync patterns formed by combining the fixed pattern and one of the variable patterns;

(d) adding one of said sync patterns to each of said data packets in a data stream, wherein consecutive ones of said data packets each have added respectively different variable patterns wherein the variable patterns are '4cead7a81' and 'cd7aea814c' expressed in a hexadecimal notation.

14. A method as defined in claim 13, wherein the fixed pattern comprises three words.

15. A method as defined in claim 14, wherein the three words includes 'eb', 'cb' and 'aa', expressed in a hexadecimal notation.

16. A method of receiving a packet data transmitted by the method defined in claim 13, said method including a step of detecting a sync.

17. A method of receiving a packet data transmitted by the method defined in claim 13, said method including the steps of:

(a) detecting a sync for examining both of a fixed pattern and a variable pattern of a data received; and (b) securing a sync for examining only the fixed pattern, wherein said step (a) processes the data until the sync is secured, and said step (b) processes the data after the sync is secured.

18. A packet data receiving apparatus for receiving the packet data transmitted by the method defined in claim 13, said receiving apparatus comprising:

(a) means for detecting a sync for examining both of a fixed pattern and a variable pattern of a data received; and (b) means for securing a sync for examining only the fixed pattern, wherein said means defined in (a) processes the data until the sync is secured, and said means defined in (b) processes the data after the sync is secured.

19. A method as defined in claim 13, wherein the packet data comprises a plurality of blocks, and the blocks includes 's' words having a block header of 'm' words, said method further comprising the step of:

adding a transmission header of 'sxk' words (k is a natural number), wherein the transmission header is divided into 'k' pieces of blocks at intervals of every 's' words, each block includes the fixed pattern of 'm' words at a top thereof, the fixed pattern employs a pattern other than patterns used in the block header.

20. A packet data transmitting apparatus for transmitting data packets, said transmitting apparatus comprising:

(a) means for generating a fixed pattern comprising 'm' multibit words ('m' is an integer greater than 0);

(b) means for generating variable, non-random patterns of predetermined bit structure, each pattern comprising 'n' words ('n' is an integer greater than 1);

(c) means for generating sync patterns comprising 'q' words ('q'=m+n), each of the sync patterns formed by combining the fixed pattern and one of the variable patterns; and (d) means for adding one of said sync patterns to each of said packets in a data stream, wherein consecutive ones of said data packets each have added respectively different variable patterns, wherein the variable patterns are '4ceacd7a81' and 'cd7aea814c' expressed in a hexadecimal notation.

21. A method of transmitting data packets, said method comprising the steps of:

(a) generating a fixed pattern comprising 'm' multibit words ('m' is an integer greater than 0);

(b) generating variable, non-random patterns of predetermined bit structure, each pattern comprising 'n' words ('n' is an integer greater than 1);

(c) generating sync patterns comprising 'q' words ('q'=m+n), each of the sync patterns formed by combining the fixed pattern and one of the variable patterns;

(d) adding one of said sync patterns to each of said data packets in a data stream, wherein consecutive ones of said data packets each have added respectively different variable patterns and, wherein the variable patterns are '4ceacd7a81' and 'cd7aea814c' expressed in a hexadecimal notation.

22. A method of transmitting data packets, said method comprising the steps of:

(a) generating a fixed pattern comprising 'm' multibit words ('m' is an integer greater than 0);

(b) generating variable, non-random patterns of predetermined bit structure, each pattern comprising 'n' words ('n' is an integer greater than 1);

(c) generating sync patterns comprising 'q' words ('q'=m+n), each of the sync patterns formed by combining the fixed pattern and one of the variable patterns;

(d) adding one of said sync patterns to each of said data packets in a data stream, wherein consecutive ones of said data packets each have added respectively different variable patterns and, wherein the packet data comprises a plurality of blocks, and the blocks includes 's' words having a block header of 'm' words, said method further comprising the step of adding a transmission header of 'sxk' words (k is a natural number), wherein the transmission header is divided into 'k' pieces of blocks at intervals of every 's' words, each block includes the fixed pattern of 'm' words at a top thereof, the fixed pattern employs a pattern other than patterns used in the block header.

\* \* \* \* \*

UNITED STATES PATENT AND TRADEMARK OFFICE
CERTIFICATE OF CORRECTION

| | |
|---|---|
| PATENT NO. | : 7,408,960 B1 |
| APPLICATION NO. | : 09/646,665 |
| DATED | : August 5, 2008 |
| INVENTOR(S) | : Masaaki Higashida et al. |

It is certified that error appears in the above-identified patent and that said Letters Patent is hereby corrected as shown below:

On the cover page, item [56], References Cited, on page 2 FOREIGN PATENT DOCUMENTS, delete duplicate reference
JP 8-335936 12/1996.

Signed and Sealed this

Ninth Day of December, 2008

JON W. DUDAS
*Director of the United States Patent and Trademark Office*